(12) United States Patent
Adams

(10) Patent No.: US 12,301,910 B2
(45) Date of Patent: May 13, 2025

(54) RECORDING SYSTEM AND METHODS OF USING SAME

(71) Applicant: Eric Michael Adams, Houston, TX (US)

(72) Inventor: Eric Michael Adams, Houston, TX (US)

( * ) Notice: Subject to any disclaimer, the term of this patent is extended or adjusted under 35 U.S.C. 154(b) by 62 days.

(21) Appl. No.: 18/374,251

(22) Filed: Sep. 28, 2023

(65) Prior Publication Data

US 2024/0114193 A1    Apr. 4, 2024

Related U.S. Application Data

(60) Provisional application No. 63/411,338, filed on Sep. 29, 2022.

(51) Int. Cl.
| | |
|---|---|
| *H04N 21/41* | (2011.01) |
| *G01C 19/5776* | (2012.01) |
| *H04N 17/00* | (2006.01) |
| *H04N 21/854* | (2011.01) |
| *H04N 23/90* | (2023.01) |
| *H04R 1/40* | (2006.01) |
| *H04R 29/00* | (2006.01) |

(52) U.S. Cl.
CPC ..... *H04N 21/4135* (2013.01); *G01C 19/5776* (2013.01); *H04N 17/002* (2013.01); *H04N 21/854* (2013.01); *H04N 23/90* (2023.01); *H04R 1/406* (2013.01); *H04R 29/005* (2013.01)

(58) Field of Classification Search
None
See application file for complete search history.

(56) References Cited

U.S. PATENT DOCUMENTS

| | | | |
|---|---|---|---|
| 10,567,641 B1* | 2/2020 | Rueckner | H04N 23/62 |
| 2015/0127486 A1* | 5/2015 | Advani | H04L 65/61 |
| | | | 705/26.41 |
| 2018/0332219 A1* | 11/2018 | Corcoran | H04N 23/611 |
| 2022/0066292 A1* | 3/2022 | Ahuja | G03B 17/561 |
| 2024/0073520 A1* | 2/2024 | Zhao | H04N 23/45 |

\* cited by examiner

*Primary Examiner* — Junior O Mendoza
(74) *Attorney, Agent, or Firm* — Eric M. Adams

(57) ABSTRACT

Recording equipment, as well as methods of using the recording equipment, methods of experiencing recorded episodes, and methods of distributing the recorded episodes.

7 Claims, 4 Drawing Sheets

RECORDING SYSTEM AND METHODS OF USING SAME

CROSS-REFERENCE TO RELATED APPLICATIONS

This application claims priority to U.S. Provisional Application No. 63/411,338 filed on Sep. 29, 2022, the disclosures of which are herein incorporated by reference in their entirety.

BACKGROUND

1. Field of Inventions

The field of this application and any resulting patent is recording equipment, as well as methods of using the recording equipment, methods of experiencing recorded episodes, and methods of distributing the recorded episodes.

2. Description of Related Art

Various methods and systems have been proposed and utilized for recording the environment, including some of the methods and systems disclosed in the references appearing on the face of this patent. However, those methods and systems lack all the steps or features of the methods and systems covered by any patent claims below. As will be apparent to a person of ordinary skill in the art, any methods and systems covered by claims of the issued patent solve many of the problems that prior art methods and systems have failed to solve. Also, the methods and systems covered by at least some of the claims of this patent have benefits that could be surprising and unexpected to a person of ordinary skill in the art based on the prior art existing at the time of invention.

SUMMARY

One or more specific embodiments disclosed herein includes a method of recording events employing a performer, comprising providing recording equipment comprising: a headset rig; a plurality of cameras, wherein the plurality of cameras comprises a plurality of omnidirectional cameras, and further wherein the plurality of cameras is located on the headset rig; a plurality of microphones, wherein the plurality of microphones comprises a combination of omnidirectional microphones and unidirectional microphones, and further wherein the plurality of microphones is located on the headset rig; a principal gyroscope, wherein the principal gyroscope measures the orientation and angular velocity of the performer, and further wherein the principal gyroscope comprises a microchip-packaged MEMS gyroscope; a microprocessor; a stabilizer, wherein the stabilizer is located on the headset rig; a plurality of lasers, wherein the plurality of lasers comprises high-accuracy displacement sensors; a GPS tracker; a plurality of lights; and a plurality of batteries; placing the headset rig onto the head of the performer; turning the microprocessor into the on mode; configuring the recording equipment, wherein the settings for the plurality of cameras and the plurality of microphones are configured; testing the plurality of cameras and the plurality of microphones; activating the recording equipment into a recording mode and recording an episode; deactivating the recording equipment to stop the recording mode; editing the episode; and uploading the episode onto an internet platform.

One or more specific embodiments disclosed herein includes a method of recording and broadcasting events employing a performer, comprising: providing recording equipment comprising: a headset rig; a plurality of cameras, wherein the plurality of cameras comprises a plurality of omnidirectional cameras, and further wherein the plurality of cameras is located on the headset rig; a plurality of microphones, wherein the plurality of microphones comprises a combination of omnidirectional microphones and unidirectional microphones, and further wherein the plurality of microphones is located on the headset rig; a principal gyroscope, wherein the principal gyroscope measures the orientation and angular velocity of the performer, and further wherein the principal gyroscope comprises a microchip-packaged MEMS gyroscope; a microprocessor; a stabilizer, wherein the stabilizer is located on the headset rig; a plurality of lasers, wherein the plurality of lasers comprises high-accuracy displacement sensors; a GPS tracker; a plurality of lights; and a plurality of batteries; placing the headset rig onto the head of the performer; turning the microprocessor into the on mode; configuring the recording equipment, wherein the settings for the plurality of cameras and the plurality of microphones are configured; testing the plurality of cameras and the plurality of microphones; activating the recording equipment into a livestreaming mode; and deactivating the recording equipment to stop the livestreaming mode.

DETAILED DESCRIPTION

1. Introduction

Figure 1:
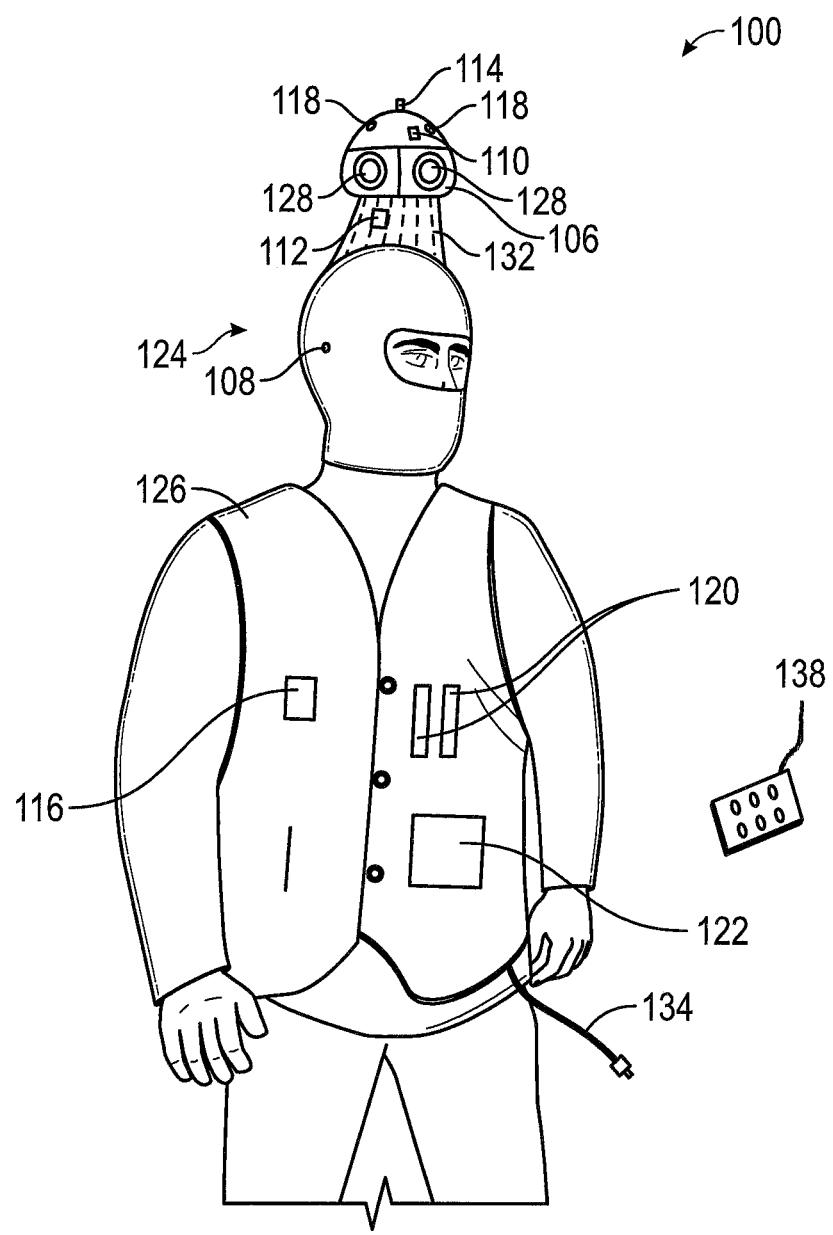
FIG. 1 shows an embodiment of recording equipment with a performer.

A detailed description will now be provided. The purpose of this detailed description, which includes the drawings, is to satisfy the statutory requirements of 35 U.S.C. § 112. For example, the detailed description includes a description of the inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in any printed publication, dictionary, or issued patent.

2. Certain Specific Embodiments

Now, certain specific embodiments are described, which are by no means an exclusive description of the inventions. Other specific embodiments, including those referenced in the drawings, are encompassed by this application and any patent that issues therefrom.

One or more specific embodiments disclosed herein includes a method of recording events employing a performer, comprising providing recording equipment comprising: a headset rig; a plurality of cameras, wherein the plurality of cameras comprises a plurality of omnidirectional cameras, and further wherein the plurality of cameras is located on the headset rig; a plurality of microphones, wherein the plurality of microphones comprises a combination of omnidirectional microphones and unidirectional microphones, and further wherein the plurality of microphones is located on the headset rig; a principal gyroscope, wherein the principal gyroscope measures the orientation and angular velocity of the performer, and further wherein the principal gyroscope comprises a microchip-packaged MEMS gyroscope; a microprocessor; a stabilizer, wherein the stabilizer is located on the headset rig; a plurality of lasers, wherein the plurality of lasers comprises high-accuracy displacement sensors; a GPS tracker; a plurality of lights; and a plurality of batteries; placing the headset rig onto the head of the performer; turning the microprocessor into the on mode; configuring the recording equipment, wherein the settings for the plurality of cameras and the plurality of microphones are configured; testing the plurality of cameras and the plurality of microphones; activating the recording equipment into a recording mode and recording an episode; deactivating the recording equipment to stop the recording mode; editing the episode; and uploading the episode onto an internet platform.

One or more specific embodiments disclosed herein includes a method of recording and broadcasting events employing a performer, comprising: providing recording equipment comprising: a headset rig; a plurality of cameras, wherein the plurality of cameras comprises a plurality of omnidirectional cameras, and further wherein the plurality of cameras is located on the headset rig; a plurality of microphones, wherein the plurality of microphones comprises a combination of omnidirectional microphones and unidirectional microphones, and further wherein the plurality of microphones is located on the headset rig; a principal gyroscope, wherein the principal gyroscope measures the orientation and angular velocity of the performer, and further wherein the principal gyroscope comprises a microchip-packaged MEMS gyroscope; a microprocessor; a stabilizer, wherein the stabilizer is located on the headset rig; a plurality of lasers, wherein the plurality of lasers comprises high-accuracy displacement sensors; a GPS tracker; a plurality of lights; and a plurality of batteries; placing the headset rig onto the head of the performer; turning the microprocessor into the on mode; configuring the recording equipment, wherein the settings for the plurality of cameras and the plurality of microphones are configured; testing the plurality of cameras and the plurality of microphones; activating the recording equipment into a livestreaming mode; and deactivating the recording equipment to stop the livestreaming mode.

In any one of the methods or systems disclosed herein, one or more enhancements may be added to an episode.

In any one of the methods or systems disclosed herein, at least one of the enhancements may comprise pressure indicators.

In any one of the methods or systems disclosed herein, the recording equipment may comprise a harness.

In any one of the methods or systems disclosed herein, the recording equipment may comprise a remote control.

In any one of the methods or systems disclosed herein, the recording equipment may comprise a bag.

3. Specific Embodiments in the Figures

The drawings presented herein are for illustrative purposes only and are not intended to limit the scope of the claims. Rather, the drawings are intended to help enable one having ordinary skill in the art to make and use the claimed inventions.

Referring to FIGS. 1-4, specific embodiments, e.g., versions or examples, of recording equipment, as well as methods of using the recording equipment, methods of experiencing recorded episodes, and methods of distributing the recorded episodes, are illustrated. These figures may show features which may be found in various specific embodiments, including the embodiments shown in this specification and those not shown.

FIG. 1 shows an embodiment of recording equipment 100. In embodiments, the recording equipment 100 may be used for recording one or more episodes 102 (see FIG. 4). In embodiments, the recorded episodes 102 may comprise real-world and/or enhanced content or media created by a producer 104 (see FIG. 4). In embodiments, there may be one or more producers 104. In embodiments, the recording equipment 100 may also be used for streaming and livestreaming. Livestreaming is streaming media simultaneously recorded and broadcast in real-time over the Internet. Livestreaming is often referred to simply as streaming. Non-live media such as video-on-demand, vlogs, and YouTube videos are technically streamed, but not live-streamed. In embodiments, the recording equipment 100 may comprise one or more cameras 106, one or more microphones 108, a principal gyroscope 110, a stabilizer 112, one or more lasers 114, a GPS tracker 116, one or more lights 118, one or more power sources 120, one or more microprocessors 122, a headset rig 124, and a harness 126. In embodiments, the headset rig 124 and the harness 126 may be worn by a performer 146. In embodiments, the performer 146 may also be the producer 104 or one of the producers 104.

As shown in FIG. 1, in embodiments, the one or more cameras 106 may comprise one or more lenses 128. In embodiments, the one or more cameras 106 may comprise an omnidirectional camera, which may also be referred to as a 360-degree camera. In embodiments comprising an omnidirectional camera, the camera 106 may possess a field of view that covers approximately the entire sphere around the camera 106. In such embodiments, the camera 106 may comprise one or more lenses 128, wherein the lens 128 comprises a single, fisheye lens. In embodiments, the camera 106 may comprises one or more lenses 128, wherein the lenses 128 alternatively comprise dual-fisheye lenses that may accommodate a full 360-degree angle. In these embodiments comprising dual-fisheye lenses 128, the camera 106 may record visual images in the form of photographs, film, or video signals with an angle of just over 180 degrees, e.g., 220 degrees. In embodiments, the recorded episodes 102 taken with the dual-fisheye lenses 128 may be converted into a 360-degree object using recording software 130 (not shown). Additionally, in embodiments, the camera 106 may comprise more than two lenses 128 to produce the recorded episodes 102. Further, in embodiments, the one or more cameras 106 may comprise a plurality of omnidirectional cameras. In embodiments, the one or more cameras 106 may be combined in a network, which may be referred to as mosaic-based cameras. In such embodiments, each of the one or more mosaic-based cameras 106 may record a small area of the surrounding environment. In embodiments, the individual images or videos of the surrounding environment may then be joined together like mosaic stones to form an omnidirectional overall image or video. In embodiments, the number of cameras 106 to be used may depend on the focal length of the lenses 128 being used. For example, the smaller the focal length, the larger the angle of view and the fewer cameras 106 that may be required. In embodiments, the one or more cameras 106 may be located on the headset rig 124. In embodiments, different types of cameras 106 may be located on the headset rig 124. In embodiments, these different types of cameras 106 may comprise a variety of lenses 128. Further, in embodiments, some of the cameras 106 may be located on the harness 126.

As shown in FIG. 1, in embodiments, the one or more microphones 108 may comprise an omnidirectional microphone. Omnidirectional microphones are microphones that capture sound with equal gain from all sides or directions of the microphone. In other embodiments, the one or more microphones 108 may comprise a unidirectional microphone, which captures sound with high sensitivity only from a specific side. Further, in embodiments, the one or more microphones 108 may comprise a mixture of omnidirectional microphones and unidirectional microphones. In embodiments, the one or more microphones 108 may be located on the headset rig 124. Additionally, in embodiments with a plurality of microphones 108, some of the microphones 108 may be located on the harness 126. In embodiments, placement of the one or more microphones 108 may depend upon the specific episode 102 being recorded by the recording equipment 100. For example, in situations where the producer 104 seeks to provide a realistic sound recording, one or more microphones 108 may be located near each of the ears of the performer 146 by use of the headset rig 124. In embodiments, the recording software 130 may be used to enhance and/or edit the sound recording from the one or more microphones 108 in order to achieve the goal of the producer 104.

As shown in FIG. 1, in embodiments, the principal gyroscope 110 may be located in the headset rig 124. In embodiments, the principal gyroscope 110 may be used for measuring or maintaining orientation and measuring the angular velocity of the performer 146 during the recording of an episode 102. In embodiments, the principal gyroscope 110 may comprise a spinning wheel or disc in which the axis of rotation (spin axis) is free to assume any orientation by itself. Further, in embodiments, the principal gyroscope 110 may comprise a microchip-packaged MEMS gyroscope, which may be referred to as a gyrometer.

As shown in FIG. 1, in embodiments, the stabilizer 112 may employ one or more gyroscopes in order to provide extra stabilization of the one or more cameras 106. In embodiments, any gyroscopes that may form part of the stabilizer 112 would be separate from the principal gyroscope 110. An example of gyroscopes being used for extra stabilization is the Steadicam, which is a brand of camera stabilizer mounts for motion picture cameras. The Steadicam uses springs and shock absorbers. Generally, a camera stabilizer, or camera-stabilizing mount, is a device designed to hold a camera in a manner that prevents or compensates for unwanted camera movement. In embodiments, the stabilizer 112 may employ springs and/or shock absorbers. In embodiments, the stabilizer 112 may sense disruptive motion, and the stabilizer 112 may employ a mechanical and/or electrical stabilization. Further, in embodiments, the stabilizer 112 may stabilize the one or more cameras 106 with remote-controlled camera heads. In such embodiments, the one or more cameras 106 may be mounted in a remote-controlled camera holder 132, which is then mounted on the performer 146 as part of the headset rig 124. In some embodiments, the one or more cameras 106 may be stabilized by shifting the weight of the one or more cameras 106 to the shoulders of the performer 146, which may allow for smoother shots. Such shoulder braces may typically be padded for comfort and allow for the attachment of zoom controllers, transmitters, and other devices.

As shown in FIG. 1, in embodiments, the one or more lasers 114 may enable non-contact measurement of height, position, and distance. In embodiments, by using multiple lasers 114, measurements such as thickness and width may also be calculated. In embodiments, the one or more lasers 114 may comprise high-accuracy displacement sensors, which may be grouped into two categories: confocal and laser triangulation. In embodiments, the one or more lasers 114 may provide detailed measurements of the environment surrounding the performer 146. For example, in embodiments, the one or more lasers 114 may provide detailed measurements of spaces and rooms within a house or other structure.

As shown in FIG. 1, in embodiments, the GPS tracker 116 may provide the location of the recording equipment 100. GPS, or Global Positioning System, is a satellite constellation supporting highly accurate positioning, navigation, and timing (PNT) measurements worldwide.

As shown in FIG. 1, in embodiments, the one or more lights 118 may be employed in low-light situations in order for the one or more cameras 106 to be capable of discerning the surrounding environment. Alternatively, in embodiments, certain modes similar to the night mode of the iPhone may be employed for the same purpose. Further, in embodiments, the shutter speed of the one or more cameras 106 may be manipulated in order to achieve the same result as the one or more lights 118.

In embodiments, the recording equipment 100 may or may not need to be mobile. In both situations, embodiments will require the one or more power sources 120. In embodiments, the one or more power sources 120 may comprise one or more batteries. In embodiments, the one or more power sources 120 may be located on and/or inside the harness 126. Further, in embodiments, the one or more power sources 120 may be located on and/or inside the headset rig 124. Additionally, in embodiments, the one or more power sources 120 may be located on and/or inside both the harness 126 and the headset rig 124. In embodiments, the one or more power sources 120 may be rechargeable. In certain embodiments where limited or no movement is required, the one or more power sources 120 may be any standard electrical outlet. In embodiments, these standard electrical outlets may comprise 120-volt outlets, 125-volt outlets, 250-volt outlets, GFCI outlets, AFCI outlets, switched outlets, and USB outlets. In embodiments, the recording equipment 100 may further comprise an electrical cord 134 connecting the recording equipment 100 to an electrical outlet. In embodiments, the recording equipment 100 may comprise one or more power sources 120, wherein the one or more power sources 120 comprise batteries, as well as the electrical cord 134.

Figure 3:
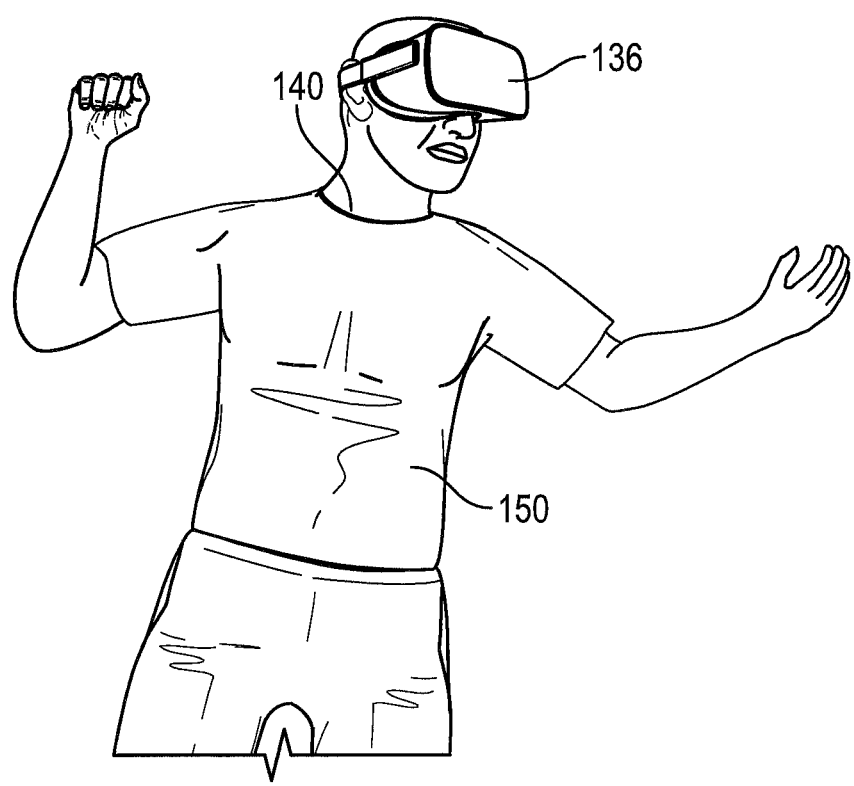
FIG. 3 shows a spectator wearing an embodiment of a viewing device and an embodiment of related equipment.
Figure 4:
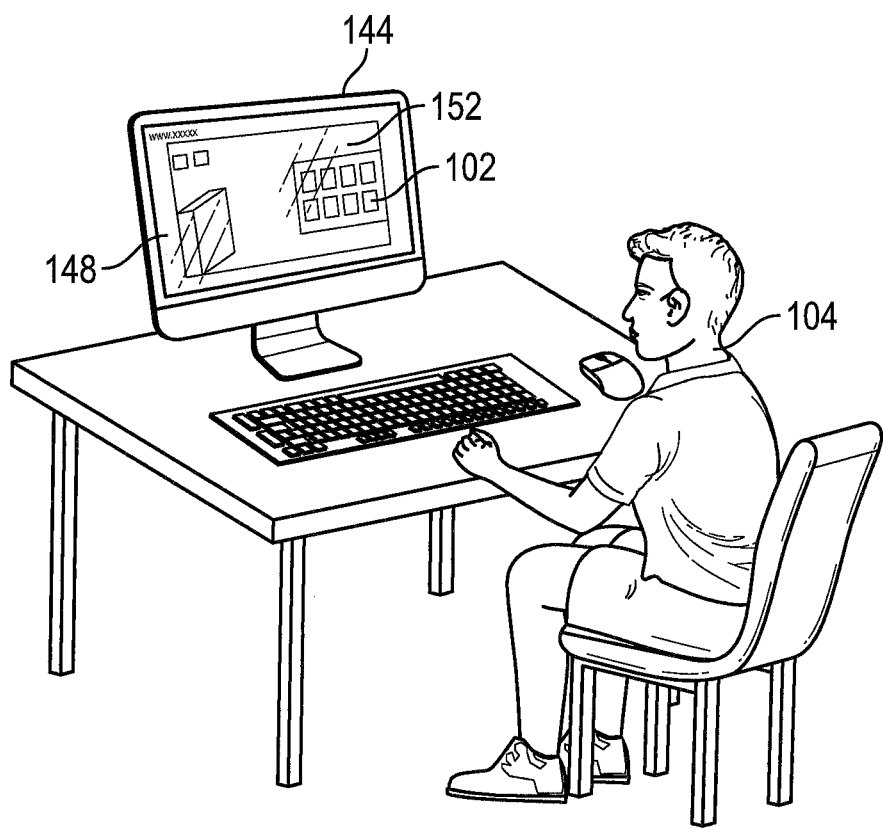
FIG. 4 shows a producer viewing an embodiment of a platform and an embodiment of a memory palace on an embodiment of a secondary device.

In embodiments, the one or more microprocessors 122 may comprise a general-purpose computer, which may be a general-purpose processing platform or other suitable processing platform. The one or more microprocessors 122 may comprise hardware and software. As used herein, "hardware" may include a combination of discrete components, an integrated circuit, an application-specific integrated circuit, a field programmable gate array, or other suitable hardware. As used herein, "software" may include one or more objects, agents, threads, lines of code, subroutines, separate software applications, two or more lines of code or other suitable software structures operating in two or more software applications or on two or more processors, or other suitable software structures. In embodiments, the one or more microprocessors 122 may use the recording software 130 to record and process input from the one or more cameras 106. In embodiments, one or more secondary devices 144, as shown in FIG. 4, may also use the recording software 130 to assist in the preparation of the episode 102. In embodiments, the one or more microprocessors 122 may also allow for Bluetooth connectivity and/or streaming capabilities. In embodiments, the one or more microprocessors 122 may be capable of connecting to a Wi-Fi network. Further, in embodiments, the one or more microprocessors 122 may be located on the headset rig 124 and/or harness 126. Also, in embodiments, the one or more secondary devices 144 may be located separately from the performer 146. In embodiments, the one or more secondary devices 144 may be located near the performer 146 or at a distance from the performer 146. Further, in embodiments, the recording software 130 may be capable of preparing the episode 102, or a plurality of episodes 102, which may be experienced by a spectator 140 using a viewing device 136, as shown in FIG. 3. In embodiments, the viewing device 136 may be a device similar to an Oculus-type device or an Apple Vision Pro. In embodiments, the viewing device 136 may be capable of running Oculus-type or Apple Vision Pro applications allowing for immersive experiences for the spectator 140.

In embodiments, the headset rig 124 may comprise a balaclava and/or a dome structure located on the head of the performer 146. In embodiments, the one or more cameras 106 may be mounted on or in the headset rig 124. Further, in embodiments, the one or more microphones 108 may be mounted on or in the headset rig 124. Additionally, in some embodiments, the one or more lasers 114, the one or more lights 118, the principal gyroscope 110, and/or the stabilizer 112 may be mounted on or within the headset rig 124. In embodiments, the headset rig 124 may comprise a more discreet apparatus that reduces visibility of the recording equipment 100, including the headset rig 124. However, in such embodiments, the reduction in visibility of the headset rig 124 and recording equipment 100 may require a tradeoff resulting in reduced coverage by the one or more cameras 106 and the one or more microphones 108.

Figure 2:
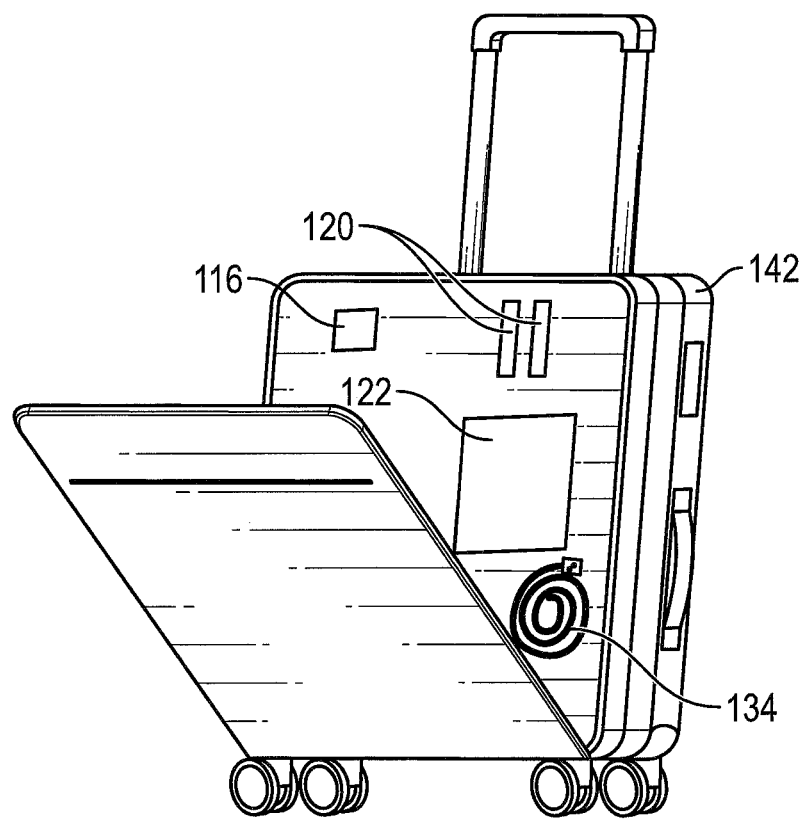
FIG. 2 shows an embodiment of a bag with certain components of an embodiment of recording equipment.

In embodiments, the harness 126 may comprise a wearable harness. In such embodiments, the harness 126 may resemble a vest. In alternative embodiments, the harness 126 may comprise a bag 142, as shown in FIG. 2, which may be carried or rolled. In embodiments, the harness 126 may incorporate certain aspects of the recording equipment 100, such as the GPS tracker 116, the one or more microprocessors 122, and the one or more power sources 120. Further, in embodiments, the harness 126 may comprise the one or more lights 118, the one or more cameras 106, and/or the one or more microphones 108.

In embodiments, the performer 146 may put on the headset rig 124 and the harness 126. In embodiments, the one or more microprocessors 122 may be powered on. In embodiments, the one or more microprocessors 122 may be powered on directly or remotely. In embodiments, the recording equipment 100 may be configured by the producer 104 after the one or more microprocessors 122 are powered on. In embodiments, the one or more secondary devices 144 may comprise a smartphone, tablet, laptop, desktop computer, or one or more servers, which may be connected to the one or more microprocessors 122 by Bluetooth, Wi-Fi, or cable. In embodiments, the producer 104 may configure the one or more microprocessors 122 via the one or more secondary devices 144. In embodiments, the producer 104 may use the one or more secondary devices 144 to configure his or her recording preferences. For example, in embodiments, the producer 104 may choose to simply record the episode 102. In embodiments, the producer 104 may also choose to livestream the episode 102. Further, in embodiments, the producer 104 may configure the settings for the one or more cameras 106, as well as the settings for the one or more microphones 108. In embodiments, other optional settings, such as filters, may be configured by the producer 104. In embodiments, the producer 104 may start a recording by pressing a button on the one or more microprocessors 122, through the one or more secondary devices 144, or through a remote control 138, which may be attached directly via cable or indirectly via Bluetooth, Wi-Fi, or radio wave to the one or more microprocessors 122. Further, in embodiments, the producer 104 may also begin the recording session through use of the one or more secondary devices 144. In embodiments, tests may be performed by the producer 104 in order to determine if the settings of the recording equipment 100 are satisfactory to the producer 104. In embodiments, the producer 104 may evaluate the video and sound settings on the one or more secondary devices 144, which may display the views to be recorded by the one or more cameras 106, display the volume of the sound to be recorded by use of a decibel scale, and/or provide a playback of a temporary sound recording for the producer 104 to evaluate. In embodiments, this testing of the video and sound settings may be performed prior to recording and/or livestreaming beginning. In embodiments, the producer 104 may stop, start, or pause the recording of the episode 102 at any time through use of the one or more secondary devices 144, the remote control 138, or a button on the one or more microprocessors 122. In embodiments, the recording of the episode 102 may be started, paused, or stopped by either the producer 104 or the performer 146.

In embodiments, once the producer 104 or the performer 144 has started recording the episode 102, the recording equipment 100 may record the environment surrounding the performer 146 omnidirectionally. In other words, in embodiments, the episode 102 may capture an omnidirectional view from the point-of-view of the performer 146 at all times during the recording of the episode 102. Further, in embodiments, the one or more microphones 108 may be configured to provide stereo and/or realistic sound recordings for the spectator 140 to experience upon viewing the episode 102.

In embodiments, once the recording of the episode 102 has ended, the producer 104 may have the option to edit the episode 102. In embodiments, one of the benefits of the omnidirectional recording of the episode 102 is that it may allow the spectator 140 to look around in any direction, at any time, and hear whatever the performer 146 may have heard, during the viewing of the episode 102. In embodiments, the producer 104 may have the option to edit or enhance the images and sound of the episode 102. In embodiments, the addition of several microphones 108 may help the producer 104 to edit or enhance the sound of the episode 102 for the spectator 140 in order to enhance the experience of the spectator 140. Thus, in embodiments, the sound recording for the episode 102 may provide the spectator 140 with the impression of movement, such as one may get with panning.

Ultimately, in embodiments, the producer 104, which may also be the performer 146, may record any type of experience using the recording equipment 100. Examples of the types of experiences that may be recorded by the producer 104 and/or performer 146 are too varied to be fully listed here. However, the following are examples of the types of experiences that may be recorded using the recording equipment 100. In embodiments, more than one performer 146 may be involved in the recording of episodes 102.

In embodiments, the recording equipment 100 may record the experiences of astronauts within a spacecraft during liftoff, on a trip to the space station or another celestial entity (such as the Moon or another planet), during a spacewalk, on the Moon, or on another planet. In such embodiments, the astronaut would be the performer 146.

In embodiments, the recording equipment 100 may record the experiences of a person attending an awards event where celebrities may be present. For example, such awards events may include the Academy Awards, the Emmy Awards, the Golden Globes, BAFTA, the MTV Music Awards, and the Country Music Awards, among many others. In embodiments, the performer 146 may be an employee or contractor of the entity producing the awards event. In embodiments, the performer 146 may be one of the invited attendees of the awards event. In embodiments, the performer 146 may even be a celebrity attendee of the awards event. In embodiments, the episode 102 may show the spectator 140 what it is like to ride in a limousine to the awards event, to get out of the limousine onto the red carpet, to walk down the red carpet, to encounter celebrities, to listen to interviews of celebrities on the red carpet, and to sit in the audience at the awards event. In embodiments, the performer 146 may be a well-known celebrity. In embodiments, the episode 102 may allow the spectator 140 to "attend" the awards event as if he or she is a celebrity—or perhaps even a particular celebrity. In some embodiments, the performer 146 may be a recipient of an award at the awards event, in which case the spectator 140 may be able to experience walking through the crowd to the podium to receive the award as well as the experience of what it would be like to give a speech to the audience. In embodiments, the producer 104 may livestream the entire episode 102 of the awards event as an alternative to viewing the awards event on a television. In embodiments, the spectator 140 may have the option of selecting among different performers 146.

In embodiments, the recording equipment 100 may also be used to record sporting events. For example, in embodiments the performer 146 may be the driver of a car in the Indy 500, NASCAR race, or F1 race. In embodiments, the performer 146 may be a rider in a Moto GP race. In other embodiments, the performer 146 may be an athlete participating in ski jumping, skiing, snowboarding, luging, or bobsledding, just to name a few.

In embodiments, the recording equipment 100 may be employed to record pornographic experiences in which the performer 146 is a participant or viewer of the experience, war or battle, skydiving, base jumping, flying in a hot air balloon, mountain climbing, rock climbing, scuba diving, visiting clubs, visiting haunted houses, urban climbing, and riding on rollercoasters. In some embodiments, the recording equipment 100 may be employed to record historical reenactments wherein the performer 146 is one of the participants.

In embodiments, the recording equipment 100 may be used to record experiences related to a movie or television show. For example, in embodiments, the performer 146 may be a main actor, character actor, or extra. In embodiments, the performer 146 may be one of the participants behind the scenes, such as a director, or simply someone attending the filming like a fly on the wall. In embodiments, the episode 102 may comprise rehearsals. In embodiments related to a television show, the performer 146 may be a member of a live audience viewing the taping of the television show. In some embodiments, the performer 146 may be participant in a recreation of a movie or television show. For example, in embodiments, the performer 146 may be able to wonder around the set of The Shining and experience certain events in the movie so that the spectator 140 may experience what it would be like to walk around the hotel and see events as they transpire similar to the events of the movie.

In embodiments, the recording equipment 100 may be used to record tasks for training purposes. For example, in embodiments, the performer 146 may be a surgeon, a welder, or a pilot. In other embodiments, the recording equipment 100 may be used to capture events like Burning Man, wherein the performer 146 is an attendee. In certain embodiments, the recording equipment 100 may be used to record the experience of attending a concert, being backstage at a concert, or perhaps being on stage as a performer at a concert. In embodiments, the recording equipment 100 may be used by police or other law enforcement so that the performer 146 is the law enforcement official. In such embodiments, the episode 102 may provide a view of what the law enforcement official was experiencing.

In other embodiments, the recording equipment 100 may be used to record vacation experiences. In embodiments, this may include various relaxing scenarios such as sitting on a beach, sitting on a balcony in an Alpine resort, hiking, sitting in a ski lodge or chalet with a roaring fire while wind and snow swirl around outside, picnicking on a mountain pasture, enjoying a train ride, enjoying a gondola ride through Venice, or perhaps a sky gondola.

In embodiments, the producer 104 may livestream the episode 102, making the episode 102 be available instantaneously, or nearly instantaneously depending on technical restrictions, to the spectators 140. In embodiments, non-livestreaming episodes 102 may be available to spectators 140 as well. In embodiments, episodes 102 may be raw, unedited recordings or edited. In embodiments, the producer 104 may record the episode 102 on the memory of the one or more microprocessors 122 or onto the memory of the one or more secondary devices 144. In embodiments, the producer 104 may also use memory devices, such as a flash drive. In embodiments, the episodes 102 may be saved in any acceptable format normally used by persons of ordinary skill in the art. Further, in embodiments, the producer 104 may transfer episodes 102 from one device to another. Given certain limits on memory as a possibility, in embodiments the producer 104 may configure the recording equipment 100 so that the episode 102 is transferred to the one or more secondary devices 144 for broadcasting and/or storage.

In embodiments, in order to make recordings available to spectators 140, the producer 104 may upload the episodes 102 to a platform 148 accessible by both producers 104 and spectators 140. In embodiments, the platform 148 (FIG. 4) may provide an online marketplace where the producer 104 may upload the episode 102 and where the spectator 140 may view or download episode 102. In embodiments, the platform 148 may be a website. In other embodiments, the platform 148 may be available through an application on a computer, tablet, smartphone, or Oculus-type or Apple Vision Pro device. In embodiments, the platform 148 may require servers in order to host the episodes 102 and activities of the producers 104 and the spectators 140. Additionally, in embodiments, the producer 104 may edit the episode 102 using the recording software 130 so that additional features and enhancements may be added to the episodes 102. For example, in embodiments, the producer 104 may add enhancements related the episode 102, such as pressure indications. In embodiments, the spectator 140 may wear related equipment 150, as shown in FIG. 3. In embodiments, related equipment 150 may comprise a specialized bodysuit, chair, pair of gloves or socks, or other related equipment. In embodiments, related equipment 150 may comprise pressure pads. In embodiments, the recording software 130 may allow for enhancements to the episode 102 so that pressure, such as the touch of a person or object in the episode 102, is transmitted to the spectator 140 through the related equipment 150. In embodiments, these enhancements may be added to the episode 102 through the recording software 130. Additionally, in embodiments, the related equipment 150 may comprise sexually-oriented equipment. In embodiments, the producer 104 may add enhancements related to the related equipment 150. In embodiments, the spectator 140 may use the related equipment 150 while viewing the episode 102. In embodiments, the producer 104 may edit the episode 102 using the recording software 130 in order to sync the activities in the episode 102 with the related equipment 150 so that the spectator 140 may experience certain events shown in the episode 102 as they occur. Additionally, in embodiments, the producer 104 may add other enhancements to the episode 102, such as wind, heat, cold, or other environmental factors shown in the episode 102. In embodiments, theatres (including home theatres) may be created to provide these additional enhancements for the spectator 140.

In embodiments, the producer 104 may create an account with the platform 148. In embodiments, the producer 104 may create his or her own memory palace 152 (FIG. 4) in order to display the episodes 102 of the producer 104 available for viewing or downloading. In embodiments, the memory palace 152 may be a three-dimensional metaverse. In embodiments, spectators 140 may be given access to the memory palace 152 so that the spectators 140 may explore the episodes 102 being made available by the producer 104. In embodiments, the memory palace 152 may comprise a foyer providing background information on the producer 104 and his or her episodes 102. In embodiments, the memory palace 152 may comprise different rooms for different groups or types of episodes 102. In embodiments, the memory palace 152 may comprise any type of structure, such as a mansion, a library, a garden, or an old-school video rental store, for example. In embodiments, an avatar of the producer 104 or a computer-generated version of a host or butler may be used to guide the spectator 140 or answer questions. In embodiments, the memory palace 152 may comprise a room or aisle devoted to newly released episodes 102. In embodiments, the platform 148 may provide the producer 104 with many different options for the memory palace 152 and how the episodes 102 may be displayed. In embodiments, the platform 148 may provide an overall searching function and a searching function for the memory palace 152 of each producer 104. In embodiments, the memory palace 152 may display or make available information regarding each episode 102. In embodiments, possible information on each episode 102 may comprise a title, duration, summary, number of views, number of likes, number of dislikes, date created, and the like. In embodiments, the producer 104 may also allow or disallow comments from spectators 140. Further, in embodiments, the platform 148 may allow for the display of the number of guests or subscribers on the outside of each memory palace 152.

In embodiments, the spectator 140 may use an Oculus-type or Apple Vision Pro virtual reality headset to experience the episode 102. Additionally, the spectator 140 may also use the related equipment 150 in order to more fully experience the episode 102. In embodiments, enhancements made available through the related equipment 150 may be optional depending on whether the producer 104 includes any enhancements with the episode 102. In embodiments, the spectator 140 may select available enhancements. In embodiments, the spectator 140 may be able to subscribe to one or more memory palaces 152. In embodiments, the spectator 140 may view the episode 102 online through the platform 148, such as on a desktop computer or any other device comprising a screen. In embodiments, the spectator 140 may have the option of downloading the episode 102 from the platform 148 in order to view the episode 102 offline.

In embodiments, access to the platform 148 may be free or may require payment of a fee. In embodiments, the fee for access to the platform 148 may be a one-time fee or an ongoing subscription. In embodiments, the platform 148 may require the producer 104 to pay a fee in order for the producer 104 to create a memory palace 152 and/or upload episodes 102. In embodiments, creating a memory palace 152 and/or uploading episodes 102 may be free for the producer 104. In embodiments, the platform 148 may impose restrictions on the producer 104 depending on the content of the episode 102. For example, in embodiments the platform 148 may impose age restrictions on certain episodes 102. In embodiments, the producer 104 may be required by the platform 148 to post warnings or disclosures before allowing spectators 140 to experience the episode 102. In embodiments, the platform 148 may reserve the right to remove any episodes 102 and/or delete the memory palace 152 of a producer 104.

In embodiments, the spectator 140 may be required to pay a fee for viewing each episode 102 or each viewing may be free. In embodiments with a fee for viewing each episode 102, the fee may be a one-time fee, an ongoing subscription fee, or a special fee attached to a particular episode 102. In embodiments, some episodes 102 may be free, some episodes 102 may be available through a subscription, and some episodes 102 may require additional fees regardless of the subscription. In embodiments, the platform 148 may provide different subscription levels. In embodiments, the platform 148 may offer a subscription with no advertisements.

In embodiments, the platform 148 may allow pay-per-view episodes 102. In embodiments, spectators 140 may rent or purchase the episode 102. In embodiments, episodes 102 may be rented or purchased nonexclusively. In embodiments, episodes 102 may be purchased exclusively. In such embodiments where the episode 102 is purchased exclusively, the spectator 140 purchasing the episode 102 may own the episode 102 and may control who may see it. In embodiments, such exclusive purchases of the episode 102 may allow ownership of the episode 102 to be transferred from one person to another person, or one memory palace 152 to another memory palace 152. In embodiments, the platform 148 may control all fees paid by producers 104 and spectators 140. In embodiments, the platform 148 may retain a percentage of the money paid for each rental or purchase of the episode 102.

In embodiments, producer 104 may create a private memory palace 152 open only to invited spectators 140. In embodiments, producers 104 may also allow spectators 140 to apply for admittance.

In embodiments, producer 104 may be paid a set fee by the platform 148 for each view of the episode 102 or for a certain number of views of the episode 102. In embodiments, producer 104 may be paid a set fee or percentage of any rentals or sales of episodes 102.

In embodiments, the platform 148 may require certain types of verifications from producers 104 and spectators 140, such as a verification that the producer 104 or spectator 140 is an adult above a certain age.

In an additional embodiment, the recording equipment 100 may be used to capture the look and dimensions of the interior of a house, room, apartment, office, or other interior space. In such an embodiment, the episode 102 may be used to create a realistic or virtual reality version of an interior space. In embodiments, the initial episode 102 would provide the producer 104 with the ability to walk through a three-dimensional version of say, a house. In embodiments, producer 104 may be the owner of the house or a decorator. In embodiments, the recording software 130 may be used to change certain aspects of the interior of the house. For example, in embodiments, the producer 104 may change the color of walls or add wallpaper while experiencing the episode 102 as the spectator 140. In embodiments, the viewing of the episode 102 by the spectator 140 would be interactive so that the spectator 140 may be able to act as the producer 104 within the virtual reality house and make changes to the interior of the house, structural features such as walls, doors, and windows. In embodiments, different types of windows or doors could be tried. Further, in embodiments, new or different furniture may be tried. In embodiments, selections of furniture with actual color options and dimensions may be selected and tried in various interior spaces in different configurations. In embodiments, the impact of interior lighting could be evaluated, as well as the appearance of the interior space at different times of the day and night. In embodiments, wholesalers and retailers of furniture could make their wares available through the interactive episode 102, and different colors, fabric options, and availability information could be provided. In embodiments, the benefit of this is that it would allow the spectator 140 to see the furniture in their house as the furniture would actually fit. In embodiments, the spectator 140 may try different colors throughout the house. In embodiments, paint sellers and wallpaper sellers may provide information. In embodiments, window shades and treatments may be provided as options for the spectator 140 to evaluate within the interactive episode 102. In embodiments, purchases may be made through the platform 148, which may host interactive episode 102. In embodiments, the platform 148 may be provided with financial information from the spectator 140 in order to complete such purchases. In embodiments, the interactive episode 102 may be used by regular consumers or as a tool for decorators. In embodiments, the interactive episode 102 may allow multiple spectators to view and interact simultaneously within the interactive episode 102, which may allow for the exchange of ideas and evaluation of different options for the house. In embodiments, contractors or other vendors may be given access to the interactive episode 102 so that the contractors and vendors may use information from the interactive episode 102 to plan for the purchase of goods or to plan for services to be provided. In embodiments, the interactive episode 102 could be used for a variety of different situations.

In embodiments, the platform 148 may provide for episode 102 to be made private or publicly available. In embodiments, the private episode 102 would require an invitation from the producer 104. In embodiments, another example of the interactive episode 102 may be situations where party planners may use the recording equipment 100 to capture a possible venue for a party or wedding. In embodiments, various venues may use the recording equipment 100 to provide information to party planners or other possible customers contemplating renting the space. For example, in embodiments, a venue may act as the producer 104 and upload a detailed, three-dimensional interactive episode 102 of the venue, which it may then share with potential renters. In embodiments, planners may act as the spectator 140 of the interactive episode 102 and begin to experiment with various ideas, which the planner may then share with the customer by inviting the customer to view the interactive episode 102. In embodiments, changes to an interactive episode 102 may be saved as different episodes 102 to capture different ideas for the same space. In embodiments, venues acting as the producer 104 may include suggestions for planners and renters based on previous events. In embodiments, each set of suggestions by the venue acting as the producer 104 may be a separate interactive episode 102. In embodiments, party planners may also keep previous events that they planned as an interactive episode 102 for sharing with potential clients or as a reference. In embodiments, the platform 148 may provide functionality that allows or disallows changes to the interactive episode, and such functionality may be controlled by the producer 104. In embodiments, party planners and/or venues may provide access to the interactive episode 102 to different vendors, such as bartenders, caterers, florists, and photographers so that each vendor may make plans for their bids.

Generally, the above-describes improved recording equipment, as well as methods of using the recording equipment, methods of experiencing recorded episodes, and methods of distributing the recorded episodes. This provides a better way of experiencing different activities, and it also provides a better way of interacting with other individuals through interactive episodes. Further, this provides a marketplace for experiences, goods, and services.

What is claimed is:

1. A method of recording events employing a performer, comprising:
   providing recording equipment comprising:
   a headset rig;
   a plurality of cameras, wherein the plurality of cameras comprises a plurality of omnidirectional cameras, and further wherein the plurality of cameras is located on the headset rig;
   a plurality of microphones, wherein the plurality of microphones comprises a combination of omnidirectional microphones and unidirectional microphones, and further wherein the plurality of microphones is located on the headset rig;
   a principal gyroscope, wherein the principal gyroscope measures the orientation and angular velocity of the performer, and further wherein the principal gyroscope comprises a microchip-packaged MEMS gyroscope;
   a microprocessor;
   a stabilizer, wherein the stabilizer is located on the headset rig;
   a plurality of lasers, wherein the plurality of lasers comprises high-accuracy displacement sensors;
   a GPS tracker;
   a plurality of lights; and
   a plurality of batteries;
   placing the headset rig onto the head of the performer;
   turning the microprocessor into the on mode;
   configuring the recording equipment, wherein the settings for the plurality of cameras and the plurality of microphones are configured;
   testing the plurality of cameras and the plurality of microphones;
   activating the recording equipment into a recording mode and recording an episode;
   deactivating the recording equipment to stop the recording mode;
   editing the episode; and
   uploading the episode onto an internet platform.

2. The method of claim 1, further comprising the step of adding one or more enhancements to the episode.

3. The method of claim 2, wherein at least one of the enhancements comprises pressure indicators.

4. The method of claim 1, wherein the recording equipment further comprises a harness.

5. The method of claim 1, wherein the recording equipment further comprises a remote control.

6. The method of claim 1, wherein the recording equipment further comprises a bag.

7. A method of recording and broadcasting events employing a performer, comprising:
   providing recording equipment comprising:
   a headset rig;
   a plurality of cameras, wherein the plurality of cameras comprises a plurality of omnidirectional cameras, and further wherein the plurality of cameras is located on the headset rig;
   a plurality of microphones, wherein the plurality of microphones comprises a combination of omnidirectional microphones and unidirectional microphones, and further wherein the plurality of microphones is located on the headset rig;
   a principal gyroscope, wherein the principal gyroscope measures the orientation and angular velocity of the performer, and further wherein the principal gyroscope comprises a microchip-packaged MEMS gyroscope;
   a microprocessor;
   a stabilizer, wherein the stabilizer is located on the headset rig;
   a plurality of lasers, wherein the plurality of lasers comprises high-accuracy displacement sensors;
   a GPS tracker;
   a plurality of lights; and
   a plurality of batteries;
   placing the headset rig onto the head of the performer;
   turning the microprocessor into the on mode;
   configuring the recording equipment, wherein the settings for the plurality of cameras and the plurality of microphones are configured;
   testing the plurality of cameras and the plurality of microphones;
   activating the recording equipment into a livestreaming mode; and
   deactivating the recording equipment to stop the livestreaming mode.

* * * * *